(12) United States Patent
Etemad et al.

(10) Patent No.: US 9,106,386 B2
(45) Date of Patent: Aug. 11, 2015

(54) REFERENCE SIGNAL CONFIGURATION FOR COORDINATED MULTIPOINT

(71) Applicant: Intel Corporation, Santa Clara, CA (US)

(72) Inventors: Kamran Etemad, Potomac, MD (US); Alexei Davydov, Nizhny Novgorod (RU); Gregory Morozov, Nizhny Novgorod (RU); Ilya Bolotin, Nizhny-Novgorod (RU)

(73) Assignee: Intel Corporation, Santa Clara, CA (US)

(*) Notice: Subject to any disclaimer, the term of this patent is extended or adjusted under 35 U.S.C. 154(b) by 149 days.

(21) Appl. No.: 13/796,720

(22) Filed: Mar. 12, 2013

(65) Prior Publication Data

US 2014/0036796 A1    Feb. 6, 2014

Related U.S. Application Data

(60) Provisional application No. 61/679,627, filed on Aug. 3, 2012.

(51) Int. Cl.
*H04W 4/00* (2009.01)
*H04L 5/00* (2006.01)
(Continued)

(52) U.S. Cl.
CPC ............ *H04L 5/0057* (2013.01); *H04L 5/00* (2013.01); *H04L 41/0836* (2013.01); *H04L 43/0811* (2013.01); *H04L 65/4092* (2013.01); *H04L 65/80* (2013.01); *H04L 67/16* (2013.01); *H04L 67/303* (2013.01); *H04N 21/23439* (2013.01); *H04N 21/25825* (2013.01); *H04W 4/00* (2013.01); *H04W 24/02* (2013.01); *H04W 24/04* (2013.01); *H04W 28/0236* (2013.01); *H04W 40/02* (2013.01); *H04W 40/34* (2013.01);
(Continued)

(58) Field of Classification Search
CPC .................................................. H04W 28/0236
See application file for complete search history.

(56) References Cited

U.S. PATENT DOCUMENTS 8,305,987 B2   11/2012   Fong et al.
2010/0238984 A1   9/2010   Sayana et al.
(Continued)

FOREIGN PATENT DOCUMENTS

| KR | 102012006188 A | 6/2012 |
| WO | WO-2012061770 A2 | 5/2012 |
| WO | WO-2014021986 A1 | 2/2014 |

OTHER PUBLICATIONS

International Application Serial No. PCT/US2013/044384, International Search Report mailed Nov. 15, 2013, 3 pgs.
(Continued)

*Primary Examiner* — Huy D Vu
*Assistant Examiner* — Kevin Cunningham
(74) *Attorney, Agent, or Firm* — Schwegman Lundberg & Woessner, P.A

(57) ABSTRACT

Coordinated Multipoint (CoMP) involves multiple transmission points or cells coordinating their individual transmissions so that a target user equipment (LTE) experiences enhanced signal reception and/or reduced interference. In order to optimally implement downlink CoMP, a serving cell needs to obtain channel state information (CSI) for the downlink channels from the multiple transmission points to the UE. This disclosure deals with radio resource control (RRC) signaling for configuring the UE to obtain and report CSI for those downlink channels.

26 Claims, 7 Drawing Sheets

(51) Int. Cl.

| | |
|---|---|
| *H04W 24/04* | (2009.01) |
| *H04W 76/02* | (2009.01) |
| *H04L 29/06* | (2006.01) |
| *H04W 24/02* | (2009.01) |
| *H04N 21/2343* | (2011.01) |
| *H04N 21/258* | (2011.01) |
| *H04W 40/02* | (2009.01) |
| *H04L 12/24* | (2006.01) |
| *H04L 12/26* | (2006.01) |
| *H04L 29/08* | (2006.01) |
| *H04W 28/02* | (2009.01) |
| *H04W 40/34* | (2009.01) |
| *H04W 72/00* | (2009.01) |
| *H04W 72/04* | (2009.01) |
| *H04W 88/06* | (2009.01) |
| *H04W 36/14* | (2009.01) |
| *H04W 16/28* | (2009.01) |

(52) U.S. Cl.
CPC ............ *H04W 72/005* (2013.01); *H04W 72/04* (2013.01); *H04W 72/042* (2013.01); *H04W 72/044* (2013.01); *H04W 72/0406* (2013.01); *H04W 72/0413* (2013.01); *H04W 76/02* (2013.01); *H04W 76/021* (2013.01); *H04W 76/023* (2013.01); *H04W 76/025* (2013.01); *H04W 76/026* (2013.01); *H04W 88/06* (2013.01); *H04W 16/28* (2013.01); *H04W 36/14* (2013.01); *Y02B 60/50* (2013.01)

(56) References Cited

U.S. PATENT DOCUMENTS

| | | | |
|---|---|---|---|
| 2011/0249713 | A1 | 10/2011 | Hammarwall et al. |
| 2011/0268007 | A1 | 11/2011 | Barany et al. |
| 2012/0039273 | A1 | 2/2012 | Nam et al. |
| 2012/0082082 | A1 | 4/2012 | Etemad et al. |
| 2012/0213109 | A1 | 8/2012 | Xu et al. |
| 2012/0213137 | A1 | 8/2012 | Jeong et al. |
| 2012/0213261 | A1 | 8/2012 | Sayana et al. |
| 2012/0134565 | A1 | 10/2012 | Zhu et al. |
| 2012/0257575 | A1 | 10/2012 | Davydov et al. |
| 2013/0176887 | A1* | 7/2013 | Seo et al. ...................... 370/252 |
| 2013/0196675 | A1* | 8/2013 | Xiao et al. .................. 455/452.1 |
| 2013/0242902 | A1* | 9/2013 | Liu et al. ....................... 370/329 |
| 2013/0301448 | A1* | 11/2013 | Sayana et al. ................ 370/252 |
| 2013/0310100 | A1* | 11/2013 | Lee et al. ...................... 455/517 |
| 2013/0322376 | A1* | 12/2013 | Marinier et al. .............. 370/329 |
| 2014/0003452 | A1* | 1/2014 | Han et al. ..................... 370/474 |

OTHER PUBLICATIONS

International Application Serial No. PCT/US2013/044384, Written Opinion mailed Nov. 15, 2013, 5 pgs.
Ericsson, et al., "Control Signaling in Support of CoMP", 3GPP TSG-RAN WG1 #69. R1-122843., (May 21, 2012), 3 pgs.

* cited by examiner

| CSI reference signal configuration | | Number of CSI reference signals configured | | | | | |
|---|---|---|---|---|---|---|---|
| | | 1 or 2 | | 4 | | 8 | |
| | | $(k',l')$ | $n_s \mod 2$ | $(k',l')$ | $n_s \mod 2$ | $(k',l')$ | $n_s \mod 2$ |
| Frame structure type 1 and 2 | 0 | (9,5) | 0 | (9,5) | 0 | (9,5) | 0 |
| | 1 | (11,2) | 1 | (11,2) | 1 | (11,2) | 1 |
| | 2 | (9,2) | 1 | (9,2) | 1 | (9,2) | 1 |
| | 3 | (7,2) | 1 | (7,2) | 1 | (7,2) | 1 |
| | 4 | (9,5) | 1 | (9,5) | 1 | (9,5) | 1 |
| | 5 | (8,5) | 0 | (8,5) | 0 | | |
| | 6 | (10,2) | 1 | (10,2) | 1 | | |
| | 7 | (8,2) | 1 | (8,2) | 1 | | |
| | 8 | (6,2) | 1 | (6,2) | 1 | | |
| | 9 | (8,5) | 1 | (8,5) | 1 | | |
| | 10 | (3,5) | 0 | | | | |
| | 11 | (2,5) | 0 | | | | |
| | 12 | (5,2) | 1 | | | | |
| | 13 | (4,2) | 1 | | | | |
| | 14 | (3,2) | 1 | | | | |
| | 15 | (2,2) | 1 | | | | |
| | 16 | (1,2) | 1 | | | | |
| | 17 | (0,2) | 1 | | | | |
| | 18 | (3,5) | 1 | | | | |
| | 19 | (2,5) | 1 | | | | |
| Frame structure type 2 only | 20 | (11,1) | 1 | (11,1) | 1 | (11,1) | 1 |
| | 21 | (9,1) | 1 | (9,1) | 1 | (9,1) | 1 |
| | 22 | (7,1) | 1 | (7,1) | 1 | (7,1) | 1 |
| | 23 | (10,1) | 1 | (10,1) | 1 | | |
| | 24 | (8,1) | 1 | (8,1) | 1 | | |
| | 25 | (6,1) | 1 | (6,1) | 1 | | |
| | 26 | (5,1) | 1 | | | | |
| | 27 | (4,1) | 1 | | | | |
| | 28 | (3,1) | 1 | | | | |
| | 29 | (2,1) | 1 | | | | |
| | 30 | (1,1) | 1 | | | | |
| | 31 | (0,1) | 1 | | | | |

Fig. 5

| | CSI reference signal configuration | Number of CSI reference signals configured | | | | | |
|---|---|---|---|---|---|---|---|
| | | 1 or 2 | | 4 | | 8 | |
| | | $(k',l')$ | $n_s \bmod 2$ | $(k',l')$ | $n_s \bmod 2$ | $(k',l')$ | $n_s \bmod 2$ |
| Frame structure type 1 and 2 | 0 | (11,4) | 0 | (11,4) | 0 | (11,4) | 0 |
| | 1 | (9,4) | 0 | (9,4) | 0 | (9,4) | 0 |
| | 2 | (10,4) | 1 | (10,4) | 1 | (10,4) | 1 |
| | 3 | (9,4) | 1 | (9,4) | 1 | (9,4) | 1 |
| | 4 | (5,4) | 0 | (5,4) | 0 | | |
| | 5 | (3,4) | 0 | (3,4) | 0 | | |
| | 6 | (4,4) | 1 | (4,4) | 1 | | |
| | 7 | (3,4) | 1 | (3,4) | 1 | | |
| | 8 | (8,4) | 0 | | | | |
| | 9 | (6,4) | 0 | | | | |
| | 10 | (2,4) | 0 | | | | |
| | 11 | (0,4) | 0 | | | | |
| | 12 | (7,4) | 1 | | | | |
| | 13 | (6,4) | 1 | | | | |
| | 14 | (1,4) | 1 | | | | |
| | 15 | (0,4) | 1 | | | | |
| Frame structure type 2 only | 16 | (11,1) | 1 | (11,1) | 1 | (11,1) | 1 |
| | 17 | (10,1) | 1 | (10,1) | 1 | (10,1) | 1 |
| | 18 | (9,1) | 1 | (9,1) | 1 | (9,1) | 1 |
| | 19 | (5,1) | 1 | (5,1) | 1 | | |
| | 20 | (4,1) | 1 | (4,1) | 1 | | |
| | 21 | (3,1) | 1 | (3,1) | 1 | | |
| | 22 | (8,1) | 1 | | | | |
| | 23 | (7,1) | 1 | | | | |
| | 24 | (6,1) | 1 | | | | |
| | 25 | (2,1) | 1 | | | | |
| | 26 | (1,1) | 1 | | | | |
| | 27 | (0,1) | 1 | | | | |

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0 – 4 | 5 | $I_{CSI-RS}$ |
| 5 – 14 | 10 | $I_{CSI-RS} - 5$ |
| 15 – 34 | 20 | $I_{CSI-RS} - 15$ |
| 35 – 74 | 40 | $I_{CSI-RS} - 35$ |
| 75 – 154 | 80 | $I_{CSI-RS} - 75$ |

Fig. 9

REFERENCE SIGNAL CONFIGURATION FOR COORDINATED MULTIPOINT

PRIORITY CLAIM

This application claims the benefit of priority under 35 U.S.C. 119(e) to U.S. Provisional Patent Application Ser. No. 61/679,627, filed on Aug. 3, 2012, which is incorporated herein by reference in its entirety.

BACKGROUND

A major feature of LTE-Advanced (Long Term Evolution-Advanced or LTE-A), as part of Release 10 of the LTE specification by the 3rd Generation Partnership Project (3GPP), is increased support for Coordinated Multi-Point (CoMP). In CoMP for the downlink, multiple cells each having a transmission point (TP) coordinate with one other in transmitting to mobile devices or terminals, referred to as user equipments (UEs) in LTE, so as to result in reduced interference and/or enhanced signal strength. In order for a set of cooperating cells to employ CoMP in transmitting to a particular target UE, knowledge of the downlink channels that exist between the TPs of the cells and the target UE needs to be obtained. Configuring the UE to deliver this information is the primary concern of the present disclosure.

BRIEF DESCRIPTION OF THE DRAWINGS

FIG. 5 is a table by which a CSI-RS configuration number and specific antenna ports are used to map CSI reference signals to specific REs for the case of a normal cyclic prefix.

FIG. 6 is a table by which a CSI-RS configuration number and specific antenna ports are used to map CSI reference signals to specific REs for the case of an extended cyclic prefix.

FIG. 7 illustrates an example of the mapping of zero power CSI reference signals to resource elements using a 16-bit bitmap.

FIG. 8 illustrates an example of the mapping of zero power CSI reference signals to resource elements using a 32-bit bitmap.

FIG. 9 is a table by which a subframe configuration number defines the periodicity of CSI reference signals.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

CoMP involves multiple transmission points or cells coordinating their individual transmissions so that a target UE experiences enhanced signal reception and/or reduced interference. A TP of a cell participating in CoMP may be a base station, referred to as an evolved Node B (eNB) in LTE, or may be a remote radio head (RRH) operated by an eNB. Techniques for performing CoMP may be broadly classified into two categories: coordinated scheduling and coordinated beamforming (CS/CB) and joint transmission (JT). CS/CB involves multiple coordinated cells sharing channel state information (CSI) for multiple UEs, while the user plane data that is transmitted to a particular UE is transmitted from only one TP. JT involves multiple coordinated TPs transmitting the same user plane data to a particular UE with appropriate beamforming weights. TP selection (TPS) is a special form of JT where only a single TP transmits beamformed user plane data to a particular UE at any one time but the TP that transmits the user plane data may change at different time instances (e.g., between subframes). The primary focus of this disclosure is on RRC signaling and configuration for the CoMP measurement set and feedback of channel state information.

System Description

Figure 1:
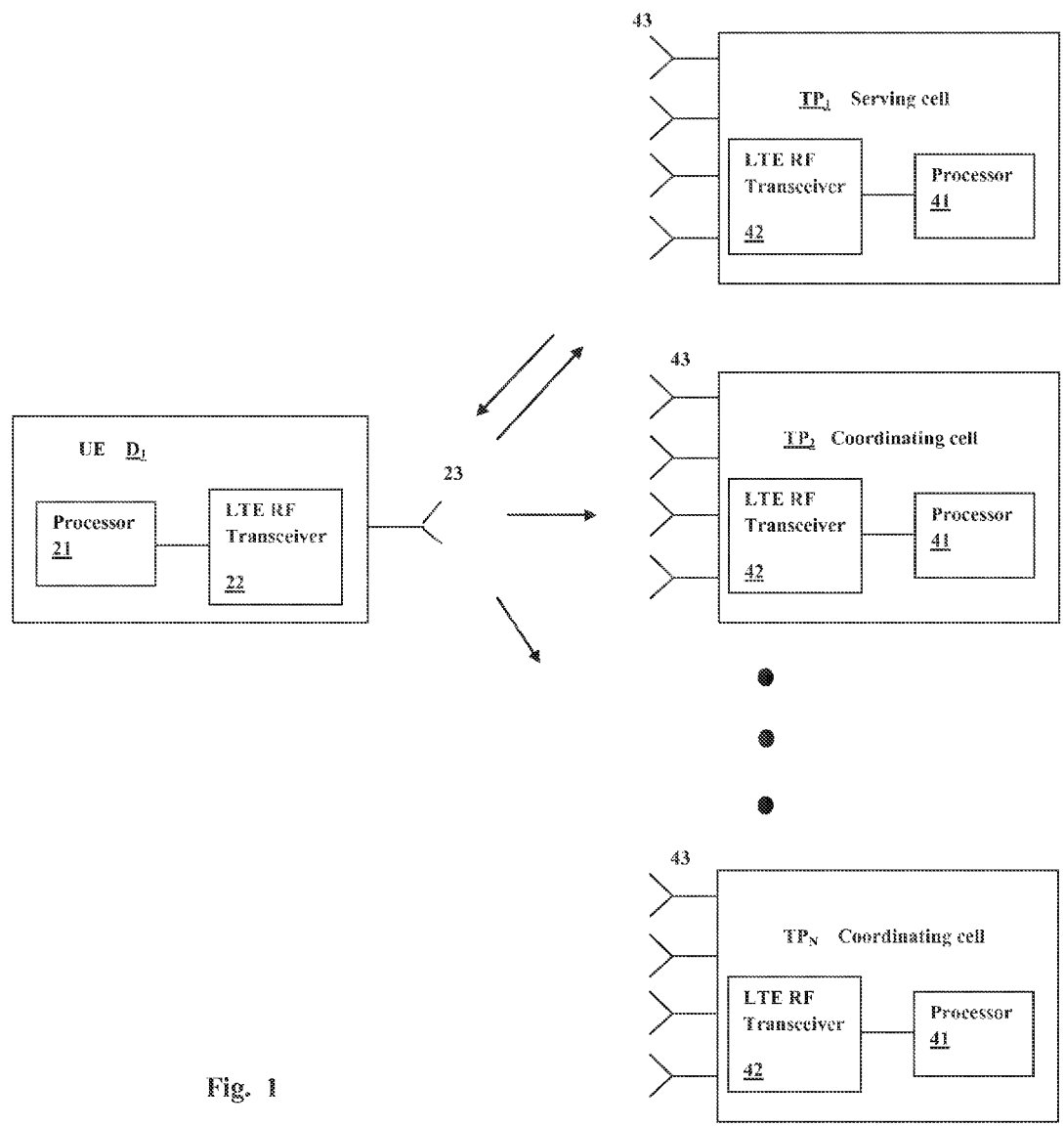
FIG. 1 illustrates an example CoMP system.

FIG. 1 shows an example of a UE $D_1$ which incorporates a processor 21 interfaced to radio-frequency (RF) transceiving circuitry 22 that is connected to one or more antennas 23. Transmission points $TP_1$ through $TP_N$, where N is the number of transmission points in the coordinating set, are shown as each incorporating a processor 41 interfaced to RF transceiving circuitry 42 that is connected to a plurality of antennas 43. The illustrated components are intended to represent any type of hardware/software configuration for providing air interfaces for LTE communication and for performing the processing functions as described herein. The transmission point $TP_1$ is shown as being the serving cell for the UE $D_1$ and may be an eNB or other type of base station. The transmission points $TP_2$ through $TP_N$ are non-serving CoMP coordinating cells and may be either base stations or RRHs operated by eNBs. eNBs communicate with one another via a standardized X2 interface, while RRHs are typically connected to an eNB by an optical fiber link. By means of these communications links, the TPs may coordinate their transmissions and share channel state information received from a UE as described below.

The physical layer of LTE is based upon orthogonal frequency division multiplexing (OFDM) for the downlink and a related technique, single carrier frequency division multiplexing (SC-FDM), for the uplink. In OFDM, complex modulation symbols according to a modulation scheme such as QAM (quadrature amplitude modulation) are each individually mapped to a particular OFDM subcarrier transmitted during an OFDM symbol, referred to as a resource element (RE). The OFDM subcarriers are upconverted to an RF (radio-frequency) carrier before transmission. An RE is the smallest time-frequency resource in LTE and is uniquely identified by antenna port, sub-carrier position, and OFDM symbol index. Multiple antennas may be used to transmit REs for purposes of beamforming or spatial multiplexing. A group of resource elements corresponding to twelve consecutive subcarriers within a single 0.5 ms slot is referred to as a resource block (RB) or, with reference to the physical layer, a physical resource block (PRB). Two consecutive slots make up a 1 ms LTE subframe. Time-frequency resources for the uplink and downlink are dynamically scheduled by the eNB for each UE in terms of RB pairs. LTE also provides for carrier aggregation whereby multiple RF carriers, each referred to as a component carrier (CC), are transmitted in parallel to/from the same UE to provide an overall wider bandwidth and correspondingly higher data transmission rate. Carrier aggregation is implemented in UE-specific manner for each UE, with one CC designated as the primary carrier or cell and the remaining CCs designated as secondary carriers or cells.

Figure 2:
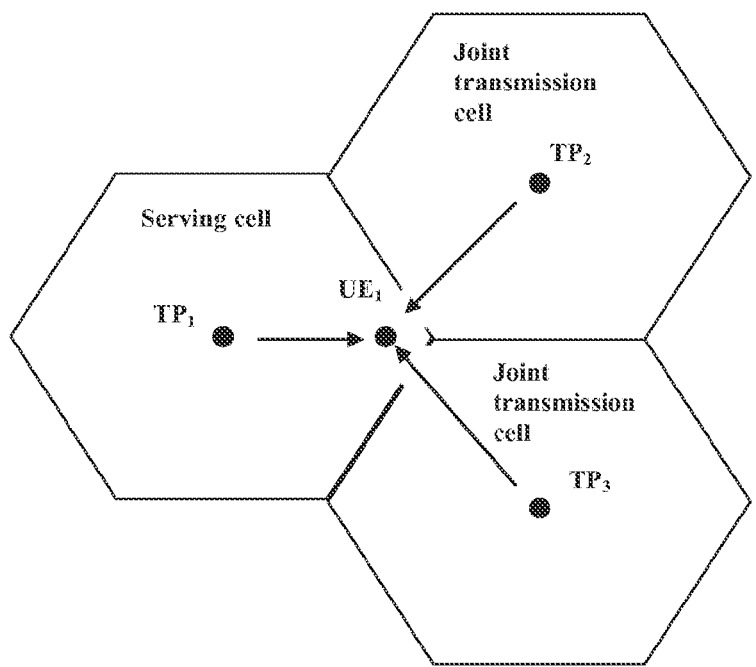
FIG. 2 shows an example of joint transmission CoMP.
Figure 3:
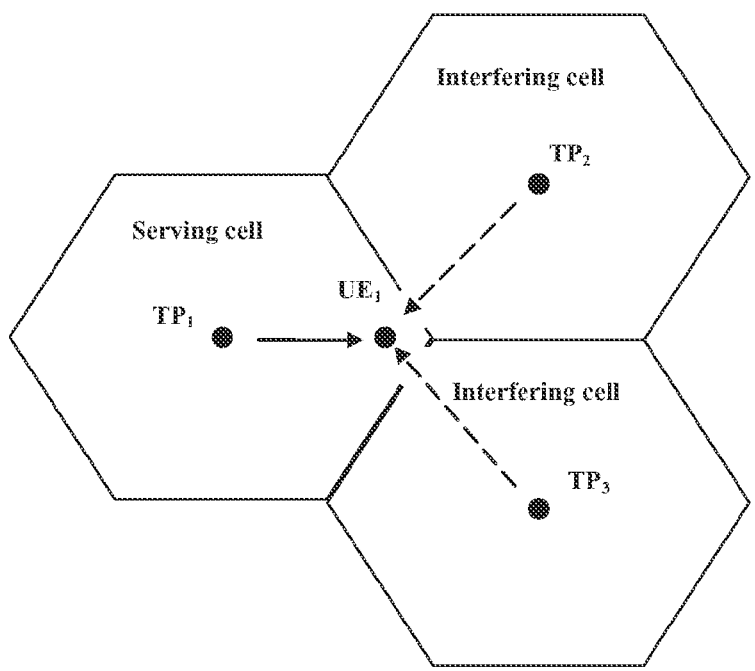
FIG. 3 shows an example of coordinated scheduling and coordinated beamforming CoMP.

The main purpose of COMP is to deal with the interference problem experienced by terminals at the edge area of cells. FIGS. 2 and 3 illustrate the operation of downlink CoMP for cases of JT and CS/CB, respectively. In FIG. 2, the serving cell $TP_1$ and the other coordinating cells $TP_2$ and $TP_3$ all jointly transmit to the cell edge terminal $UE_1$. By coherently or non-coherently combining the joint transmissions, the reception power at the terminal is increased. In FIG. 3, the coordinating cells $TP_2$ and $TP_2$ coordinate their antenna weightings and scheduling of downlink transmissions to terminals other than $UE_1$ in manner that reduces the interference at $UE_1$. In order to perform either of these functions, as well to select the optimum configuration of TPs, the serving cell needs to know the downlink channel from each TP to the target UE. LTE provides reference signals that may be used by a UE to obtain downlink channel state information (CSI) for a transmitting cell, referred to as channel state information reference signals (CSI-RS). The UE may then feedback the CSI thus obtained to the serving cell in the form of a CSI report.

CSI-RS are transmitted using REs otherwise allocated to the PDSCH with a configurable periodicity and spanning the entire transmit band. Up to eight CSI-RS, each corresponding to a different antenna port, may be transmitted by a cell. A UE may use the CSI-RS to estimate the channel and produce a CSI report that is fed back to the serving cell via the physical uplink control channel (PUCCH). A channel state information report may include a channel quality indicator (CQI) that represents the highest modulation and coding scheme that could be used in the channel without exceeding a specified error rate, a rank indicator (RI) that represents the number of spatial multiplexing layers that could be used in the channel, a precoding matrix indicator (PMI) that represents a preferred antenna weighting scheme for transmitting to the UE, and a sub-band (SB) indicator that represents the subcarriers preferred by the UE. In order to configure a UE to receive and process reference signals and to provide appropriate feedback in the form of channel state information reports, the eNB signals the UE using the radio resource control (RRC) protocol.

Figure 4:
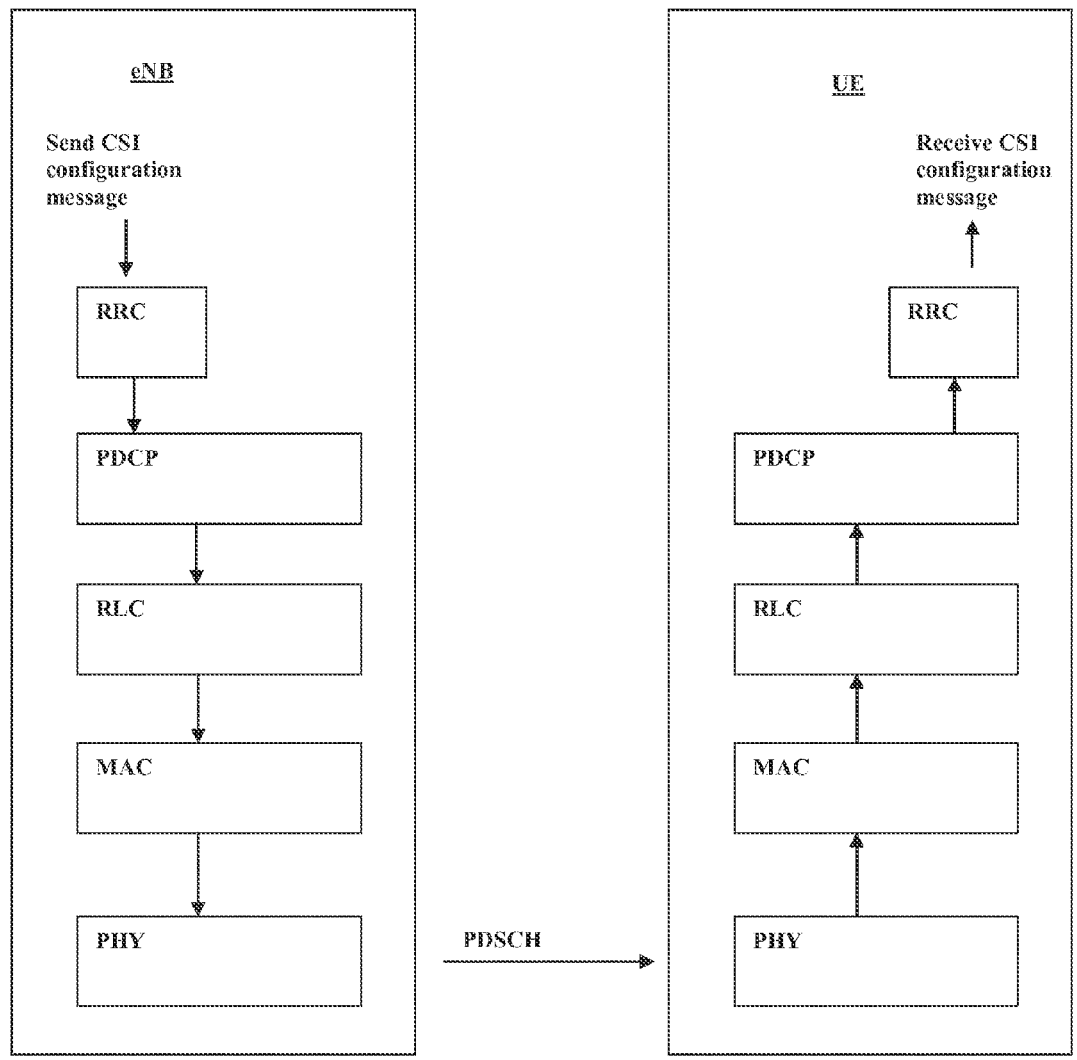
FIG. 4 illustrates transmission of CSI configuration information via RRC signaling.

The LTE air interface, also referred to as the radio access network (RAN), has a protocol architecture that may be basically described as follows. In the control plane, the radio resource control (RRC) layer is in control of radio resource usage and communicates with the packet data compression protocol (PDCP) layer via signaling radio bearers. In the user plane, the PDCP layer receives radio bearers to which are mapped IP (internet protocol) packets. The PDCP layer communicates with the radio link control (RLC) layer via the radio bearers, and the RLC layer communicates with the medium access control (MAC) layer through logical channels. The MAC layer communicates via transport channels with the physical layer (PHY). The primary transport channels used for the transmission of data, the uplink shared channel (UL-SCH) and downlink shared channel (DL-SCH), are mapped to the physical uplink shared channel (PUSCH) and physical downlink shared channel (PDSCH), respectively, at the physical layer. As illustrated in FIG. 4, an RRC message that transmits CSI-RS configuration information from an eNB to a UE originates in the RRC layer of the eNB and, after traversing the protocol layers, is then transmitted to the UE via the PDSCH. The UE then processes the message at its corresponding RRC layer.

CSI-RS and Measurement Configuration

Described below are techniques for RRC signaling related to CSI measurement and feedback configuration for the CoMP measurement set, where the CoMP measurement set is defined as the set of non-zero power CSI-RS transmitted by particular TPs about which the UE is to perform CSI measurements. Based upon those measurements, the UE sends CSIreports back to the serving cell. The serving cell, based on RSRP (reference signal received power) as well as other considerations (e.g., SRS (sounding reference signal) measurements), selects a set of CSI-RSs to be included in the CoMP Measurement set. By means of RRC messages, the serving cell eNB configures the UE to measure CSI-RSs that are transmitted by particular TPs and send CSIreports based thereon to the eNB. As described below, the configuration involves informing the UE of the downlink time-frequency resources used for non-zero power (NZP) and zero power (ZP) CSI-RS that transmitted by one or more TPs. Interference measurement resources (IMR) are also defined for use by the UE in determining the amount of interference received from both coordinating cells and neighbor cells not a part of the CoMP coordinating set. Additionally, particular CSI processes are designated for feedback by UE, where each such CSI process includes both a NZP-CSI-RS resource and an interference measurement resource. For each CSI process, the manner in which. feedback is to be provided by the UE in the form of CSIreports is also defined. These configurations are captured in a different information elements (IEs) transmitted by RRC signaling such as in an RRCReconfiguration message.

One information element, CSI-RS-Config-r11, defines the CSI-RS configuration which includes the set of non-zero power (NZP) CSI-RS resources as well as zero power (ZP) CSI-RS resources and interference measurement (IM) resources. An example of the RRC message expressed in Abstract Syntax Notation.1 (ASN.1) for CSI-RS configuration is as follows:

```
-- ASN1START
CSI-RS-Config-r11 ::=     SEQUENCE {
    csi-RS-ConfigNZP-r11              CHOICE {
      release                NULL,
      setup                  SEQUENCE {
        CSI-RS-Identity-NZP-r11::=          INTEGER (1.. maxCSIMeas)
        antennaPortsCount-r11           ENUMERATED {an1, an2, an4, an8},
        resourceConfig-r11              INTEGER (0..31),
        subframeConfig-r11              INTEGER (0..154),
        p-C-r10                         INTEGER (-8..15)
      }
    }                                                            OPTIONAL,
    -- Need ON
    zeroTxPowerCSI-RS-r11    CHOICE {
      release                NULL,
      setup                  SEQUENCE {
        zeroTxPowerResourceConfigList-r11    BIT STRING (SIZE (16)),
        resourceConfig-r11    BIT STRING (SIZE (16)),
```

```
        zeroTxPowerSubframeConfig-r11    INTEGER (0..154)
    }
}                                                          OPTIONAL
-- Need ON
}
-- ASN1STOP
```

In the above code fragment, the csi-RS-ConfigNZP-r11 field defines the NZP CSI-RS resource with an identity index (CSI-RS-Identity-NZP-r11), number of antenna ports from which the CSI-RS will be sent (antennaPortsCount-r11) which corresponds to the number of CSI reference signals, CSI-RS configuration number (resourceConfig-r11), subframe periodicity and offset (subframeConfig-r11), and the relative power level of CSI-RS (p-C-r10) to power level of PDSCH for which CSI is calculated. The CSI-RS configuration number and the specific antenna port are used to map the CSI-RS to specific REs using the tables of FIGS. 5 and 6 for normal and extended cyclic prefixes, respectively (See 3GPP TS 36.211 Release 10, tables 6.10.5.2-1 and 6.10.5.2-2).

Figures 7, 8:
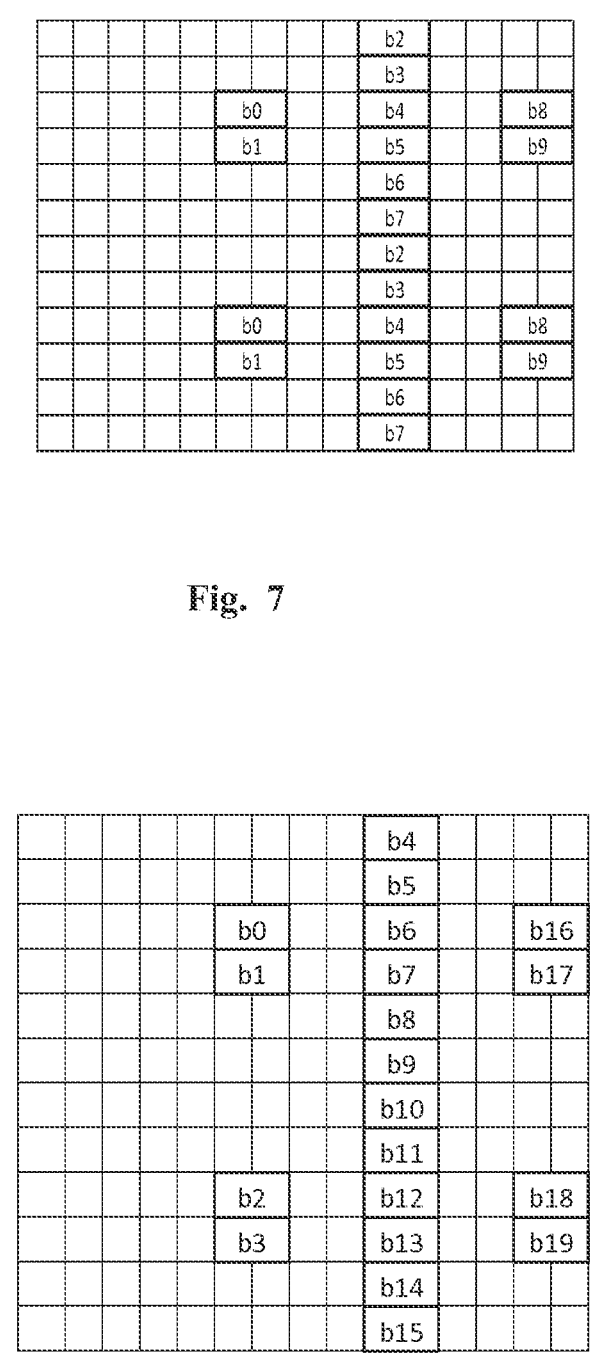

The zeroTxPowerCSI-RS-r11 field in the above code defines the ZP CSI-RS resources and IM resources. In one embodiment, the interference measurement resources belong to the set of configured ZP CSI-RS. In one embodiment, the zeroTxPowerResourceConfigList-r11 field for configuring ZP CSI-RS is a 16-bit bitmap where each bit corresponds to four REs in a subframe that are to be used as a ZP CSI-RS resource. An example of bitmap assignment to ZP CSI-RS resources with four RE granularity is shown in FIG. 7 for a subframe with normal cyclic prefix length bits where each bit b0 through b9 corresponds to four REs. If higher granularity ZP CSI-RS resources are needed, the length of the bit string can be extended to 32 bits where each bit b0 through b19 corresponds to two REs as shown in FIG. 8.

Since some of the ZP CSI-RSs can be used to improve the signal-to-interference-plus-noise ratio (SINR) on NZP CSI-RS resources of neighboring cells, the interference measurement resources may be a subset of ZP CSI-RS. It is then necessary to indicate a subset of than that should be used by the UE for interference measurements. The same bitmap approach can be used to indicate the subset of ZP CSI-RS resources as IM resources where the field resourceConfigList-r11 of length 16 bits is introduced for the zeroTxPowerCSI-RS-r11 RRC command as shown in the above code to indicate which of ZP CSI-RS are to be used for interference measurement. The indicated interference measurement resources should be a subset of ZP CSI-RS configured by zeroTxPowerResourceConfigList-r11. In another embodiment one ZP CSI-RS resource index in the range of (0 . . . 31) or (0 . . . 15) to indicate either two or four REs (depending on the embodiment) are signaled to indicate the interference measurement resource, where the resourceConfig-r11 filed corresponds to the CSI-RS configuration numbers defined in Table 6.10.5.2-1 and 6.10.5.2-2 of TS 36.211 as done for the CSI-RS configuration number (where two or four REs corresponds to two or four CSI reference signals, respectively). The indicated interference measurement resources should be a subset of ZP CSI-RS configured by zeroTxPowerResourceConfigList-r11.

In another embodiment the NZP CSI-RS resource(s) can be used for interference measurements in addition or instead of to ZP CSI-RS resources. In this case the interfMeasurementResource-r11 field can be added to the csi-RS-r11 signaling to indicate whether the UE should measure the interference on the NZP CSI-RS resource in addition to the channel measurements. An example of the RRC message in ASN.1 is:

```
-- ASN1START
CSI-RS-Config-r11 ::=       SEQUENCE {
    csi-RS-r11              CHOICE {
        release                 NULL,
        setup                   SEQUENCE {
            CSI-RS-Identity-NZP-r11 ::=     INTEGER (1.. maxCSIMeas)
            antennaPortsCount-r11           ENUMERATED {an1, an2, an4, an8},
            resourceConfig-r11              INTEGER (0..31),
            subframeConfig-r11              INTEGER (0..154),
            p-C-r11                         INTEGER (-8..15),
            interfMeasurementResource-r11   BOOL (0,1)
        }
    }                                                       OPTIONAL,
    -- Need ON
    zeroTxPowerCSI-RS-r11   CHOICE {
        release                 NULL,
        setup                   SEQUENCE {
            zeroTxPowerResourceConfigList-r11       BIT STRING (SIZE (16)),
            interfMeasurementResourceConfigList-r11 (0...31),
            zeroTxPowerSubframeConfig-r11           INTEGER (0..154)
        }
    }                                                       OPTIONAL
    -- Need ON
}
-- ASN1STOP
```

Alternatively, the IM resource configuration can be defined using a separate RRC message and signaled as a combination of a resourceConfig-r11 bitmap (or one ZP CSI-RS resource configuration for another embodiment) and subframe configuration (subframeConfig-r11), where each IM resource is identified by the CSI-IM-Identity-r11 field. An example of the RRC message is:

```
CSI-IM-Config-r11    CHOICE {
    release                  NULL,
    setup                    SEQUENCE {
        CSI-IM-Identity-r11          INTEGER (0..3),
        resourceConfig-r11           BIT STRING (SIZE (16)),
        subframeConfig-r11           INTEGER (0..154)
    }
}                                    OPTIONAL
-- Need ON
```

The subframe configuration is defined in 36.211 by table 6.1.0.5.3-1 as shown in FIG. 9. The subframe configuration period $T_{CSI-RS}$ and the subframe offset $\Delta_{CSI-RS}$ for the occurrence of CSI reference signals are listed in Table 6.10.5.3-1. The parameter $I_{CSI-RS}$ can be configured separately for CSI reference signals for which the UE shall assume non-zero and zero transmission power. Subframes containing CSI reference signals should satisfy the following equation:

$$(10 n_f + \lfloor n_s/2 \rfloor - \Delta_{CSI-RS}) \bmod T_{CSI-RS} = 0.$$

Multiple IM resources may be configured for the UE to enable interference measurements for multiple interference hypotheses as shown in the following example message:

```
CSI-IM-List-r11   SEQUENCE {
    CSI-IM-Identity-r11          INTEGER (0..3),
}                                OPTIONAL
-- Need ON
```

In another embodiment, implicit indexing (by order of configuration) can be assumed for CSI-RS-Identity-NZP-r11 and CSI-IM-Identity-r11. In that case, configuration of the CSI-RS-Identity-NZP-r11 and CSI-IM-Identity-r11 fields is not necessary for measurement resource configurations.

A CSI process is configured as combination of NZP CSI-RS, IM resource, and measurement subframe set. Each CSI process is identified by a CSI process index (csi-Process-Identity-r11 in the example code below) and subframe set by a csi-MeasSubframeSet-r11. For each CSI process, the UE measures the quality of the downlink channel and produces a channel state information report that, as described above, may include a CQI, RI, PMI, and preferred subbands. The measurement subframe specifies particular subframes for which the UE is to measure and report channel quality. Parameters for each CSI process may also include the following fields: common-RI-Report-r11, common-SB-Report-r11 and common-RI-PMI-Report-r11 which indicate re-use of RI, preferred subbands, and/or RI-PMI from one of CSI processes indicated by ref-Csi-Process-Identity-r11. An example message is as follows:

```
CSI-ProcessList-r11 ::= SEQUENCE {
    csi-Process-Identity-r11     INTEGER (1...4),
    cellIdx-r11,                 INTEGER (0..7),
    CSI-RS-Identity-NZP-r11,     INTEGER (0..3),
    CSI-IM-identity-r11,         INTEGER (0..3),
    csi-MeasSubframeSet-r11,     MeasSubframePattern-r10,
    common-RI-Report-r11   CHOICE {
        release                  NULL,
        setup
            ref-Csi-Process-Identity-r11 INTEGER (1...4)
    }
    common-SB-Report-r11   CHOICE {
        release                  NULL,
        setup
            ref-Csi-Process-Identity -r11 INTEGER (1...4)
    }
    common-RI-PMI-Report-r11 CHOICE {
        release                  NULL,
        setup
            ref-Csi-Process-Identity -r11 INTEGER (1...4)
    }
}
```

If common-RI-Report-r11, common-SB-Report-r11, common-RI-PMI-Report-r11 are configured for a particular CSI, then the rank indicator, preferred set of subbands, and precoding matrix indicator/rank indicator, respectively, are dropped and not transmitted in the channel state information report for that CSI process to save signaling overhead. The CSI dropping rules for periodic reports on the PUCCH for collision handling should take into account that the report is not transmitted and PUCCH resources are vacant. The CSI feedback for the CSI process in this case should be calculated conditioned on the report for CSI-process indicated ref-Csi-Process-Identity-r11 associated with reference CSI process.

In the above code example, when carrier aggregation is configured, an additional parameter cellIdx-r11 may be used to indicate the cell on which CSI process is defined. Parameters of CSI feedback for multiple CSI processes may be configured for the primary carrier as follows:

```
CQI-ReportConfigList-r11 ::= SEQUENCE {
    csi-Process-Identity-r11         INTEGER (1...4),
    CQI-ReportConfig-r11
}
```

Parameters of CSI feedback for multiple CSI processes may be configured for the secondary carrier as follows:

```
CQI-ReportConfigSCellList-r11 ::=    SEQUENCE {
    csi-Process-Identity-r11             INTEGER (1...4),
    CQI-ReportConfigSCell-r11
}
```

In another embodiment, the csi-Process-Identity-r11 parameter is unique within each component carrier. In one embodiment, the parameter csi-Process-Identity-r11 is unique across multiple configured carriers. In the latter case, for example, the csi-Process-Identity-r11 parameter may be defined in the range of 0 to 31. CSI reports for each component carrier cell may be concatenated in increasing order of CSI process index followed by CSI report concatenation from multiple component carriers in increasing order of cell index. If only one CSI Process can be configured for a CC (e.g., when no CoMP or a transmission mode not supporting CoMP is configured for such CC), the value of csi-Process-Identity-r11 may be assumed by default, for example, as csi-Process-Identity-r11=1 (or 0).

It may be desired that the UE only use particular PMIs in its channel state information reports for particular CSI processes. A set of restricted PMIs for associated CSI processes may be communicated from the eNB to the UE by an RRC message. An example message that also configures the transmission mode for the UE is the following code:

```
AntennaInfoDedicated-r11 ::=      SEQUENCE {
    transmissionMode-r11              ENUMERATED {
                                          tm1, tm2, tm3, tm4, tm5, tm6, tm7,
tm8-v920,
                                          tm9-v1020, tm10, spare7, spare6,
    spare5, spare4,
                                          spare3, spare2, spare1},
    codebookSubsetRestrictionList-r11   SEQUENCE {
        csi-Process-Identity-r11               INTEGER (1...4),
        codebookSubsetRestriction-r11          BIT STRING
OPTIONAL,         -- Cond TMX
    }
    ue-TransmitAntennaSelection       CHOICE{
        release                           NULL,
        setup                             ENUMERATED {closedLoop, openLoop}
    }
}
```

The one or more PMIs that are to be restricted for a particular CSI process are indicated in the above code fragment by the fields codebookSubsetRestriction-r11 and csi-Process-Identity-r11, respectively. Multiple codebookSubsetRestriction-r11's may defined, each with an associated CSI process to indicate the restricted PMI or PMIs for that process.

For CoMP, a new transmission mode (e.g., TM10) is defined which supports CSI reports for one or more CSI processes and uses random UE-specific reference signal based precoding for fallback mode. The new transmission mode uses DCI based on Format 2D with PDSCH RE mapping and quasi co-location (PQI) field to inform the UE about the transmitting point or set of transmitting points.

Aperiodic channel-state reports are delivered by the UE when explicitly requested to do so by the network using a flag in the CSI request field of the DCI carried by the PDCCH or enhanced PDCCH. The CSI request field is a two-bit field that when set to "00" indicates no CSI report is requested as described in the LTE specifications (See 3GPP TS 36.213). When the CSI request field is set to "10" or "11," it indicates that a CSI report is triggered for one of two alternative sets of CSI processes as configured by higher layers. RRC signaling may be used to tell the UE which CSI processes are to be reported on when a flag is detected in the CSI request field. An example RRC message defines aperiodic feedback aperiodicCSI-Trigger-r11 as follows:

```
CQI-ReportAperiodic-r11 ::=       CHOICE {
    release                           NULL,
    setup                             SEQUENCE {
        cqi-ReportModeAperiodic-r11       CQI-ReportModeAperiodic,
        aperiodicCST-Trigger-r11          SEQUENCE {
            trigger1-r11                      BIT STRING (SIZE (15)),
            trigger2-r11                      BIT STRING (SIZE (15))
        }                                     OPTIONAL
    -- Need OR
    }
}
```

The aperiodicCSI-Trigger-r11 field in the above code indicates for which CSI processes the aperiodic CSI report is triggered when one or more CSI processes are configured. The trigger1-r11 field is a bit string that corresponds to the CSI request field "10," and the trigger2-r11 field is a bit string that corresponds to the CSI request field "11." Each bit in the bit strings corresponds to a particular CSI process. For example, bit 0 in the bit string may corresponds to the CSI process with CSIProcessId=0, and bit 1 in the bit string corresponds to the CSI process with CSIProcessId=1 and so on. Each bit has either value 0 to mean that no aperiodic CSI report is triggered for that CSI process or value 1 to mean that the aperiodic CSI report is triggered. In the above code example, the trigger1-r11 and trigger2-r11 are 15-bit bit strings, meaning that at most 15 bits can be set to value 1 in each bit string to request 15 CSI reports. The size of bit strings should depends on the maximum number of CSI processes to be configured for a UE across all carriers when CoMP is used combined with carrier aggregation based on UE capability. In the above example, the bit string size of 15 could be used for three CSI processes configured on each of five carriers. In another embodiment, 20-bit indexes could be used to allow at most 20 bits to be set to value 1 in the bit string if a maximum of four CSI processes are allowed per carrier. Also, in other embodiments, more trigger fields can be defined. For example, trigger1-r11, trigger2-r11, trigger3-r11, etc. could be included in the RRC message with more bits being correspondingly allocated for the CSI request fields in the DCI. Also, in one embodiment, for the PDCCH common search space, the CSI request field is one bit and is used to trigger the CSI process with the smallest CSI process index.

Example Embodiments

In example embodiments, a base station for acting as an eNB and a UE both include a transceiver for providing an LTE air interface and processing circuitry connected to the transceiver. The eNB is configured to act as a serving cell to the UE and act as one of a plurality of cooperating coordinated multipoint (CoMP) transmission points (TPs) for the UE. The processing circuitry of the UE is to receive RRC messaging transmitted by the eNB according to any or all of the following example embodiments. The processing circuitry of the eNB may be to configure the UE to receive channel state information (CSI) reference signals (CSI-RS) transmitted from one or more of the cooperating TPs by transmitting a radio resource control (RRC) configuration message to the UE, wherein the RRC configuration message includes a set of indexed non-zero power (NZP) CSI-RS resources that are to be included in a CoMP measurement set, a set of zero power (ZP) CSI-RS resources, and interference measurement (IM) resources for use by the UE making interference measurements. The RRC message may further include subframe configuration periods including subframe offsets for separately specifying the periodicity of the NZP CSI-RS, IM resources, and the ZP CSI-RS. The IM resources may be a set of indexed IM resources and may be a subset of the set of ZP CSI-RS resources. The set of ZP CSI-RS resources may be transmitted as a bitmap (e.g., 16-bit) with each bit corresponding to a particular CSI-RS configuration that is to be regarded as having zero transmission power and the set of IM resources may be configured with a bitmap indicating which of the ZP-CSI resources are to be used for interference measurements. The set of IM resources may be configured with a bitmap (e.g., 16-bit) with each bit corresponding to a particular group of four resource elements (REs) belonging to the set of ZP CSI-RS or configured with a bitmap (e.g., 32-bit) with each bit corresponding to a particular resource element (RE) pair belonging to the set of ZP CSI-RS resources. The set of IM resources may be configured as a particular CSI-RS configuration with four antenna ports whose resources are to be used by the UE for interference measurement or is configured as a particular CSI-RS configuration with two antenna ports whose resources are to be used by the UE for interference measurement. The processing circuitry may be to transmit explicit indexes of the NZP CSI-RS resources in the RRC message or to implicitly indicate the indexes of the NZP CSI-RS resources by their order of configuration in the RRC message. The RRC configuration message may include an indication that one or more particular NZP CSI-RS resources is an interference measurement (IM) resource for use by the UE in making interference measurements. The processing circuitry may be to transmit an RRC message including configuration of multiple indexed IM resources to enable interference measurements by the UE for multiple interference hypotheses. The processing circuitry may be to transmit explicit indexes of the IM resources in the RRC message or to implicitly indicate indexes of the IM resources by their order of configuration in the RRC message. The processing circuitry may be to transmit explicit indexes of the NZP CSI-RS resources in the RRC message or to implicitly indicate indexes of the NZP CSI-RS resources by their order of configuration in the RRC message. The processing circuitry may be to configure one or more indexed CSI processes via RRC messaging, where each CSI process is as a combination of a NZP CSI-RS resource, an IM resource, and a measurement subframe set specifying for which subframes CSI is to be reported by the UE. Two or more CSI processes may be configured such that CSI is to be reported using a common rank indicator (RI), a common precoding matrix indicator (PMI), or a common preferred set of subbands. The processing circuitry may be to, if carrier aggregation is configured, configure the one or more indexed CSI processes with a cell index indicating for which component carrier the CSI process is defined. The CSI process index may be unique across multiple component carriers or unique within each configured component carrier. The CSI process index may be equal to a default value when only one CSI process on the component carrier or a transmission mode not supporting CoMP can be configured. The processing circuitry may be to configure the UE to transmit CSI reports concatenated in increasing order of CSI process index and, for each CSI process index when carrier aggregation is configured, concatenated in increasing order of cell index. The processing circuitry may be to configure each CSI process with a set of restricted PMIs for reporting CSI. The processing circuitry may be to configure aperiodic CSI process sets via an RRC message with a bit string where each bit of the bit string corresponds to a CSI process index and indicates whether or not CSI is to be reported by the UE when a corresponding trigger is received.

The embodiments as described above may be implemented as methods for operation and/or in various hardware configurations that may include a processor for executing instructions that perform the methods. Such instructions may be contained in a suitable storage medium from which they are transferred to a memory or other processor-executable medium.

The subject matter has been described in the context of an LTE network. Except where inconsistencies would arise, the subject matter could be used in other types of cellular networks with references to a UE and eNB replaced by references to a terminal and base station, respectively.

The subject matter has been described in conjunction with the foregoing specific embodiments. It should be appreciated that those embodiments may also be combined in any manner considered to be advantageous. Also, many alternatives, variations, and modifications will be apparent to those of ordinary skill in the art. Other such alternatives, variations, and modifications are intended to fall within the scope of the following appended claims.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A user equipment (UE) device for operating in a Long Term Evolution (LTE) network, comprising:
  a transceiver for providing an LTE air interface to an evolved Node B (eNB); and,
  processing circuitry connected to the transceiver and to:
  receive a radio resource control (RRC) configuration message from the eNB that configures the UE to receive channel state information (CSI) reference signals (CSI-RS) transmitted from one or more coordinated multi-point (CoMP) transmission points (TPs);
  wherein the RRC configuration message includes a set of indexed non-zero power (NZP) CSI-RS resources that are to be included in a CoMP measurement set, a set of zero power (ZP) CSI-RS resources, and interference measurement (IM) resources for use by the UE in making interference measurements;
  receive RRC configuration messaging that configures a plurality of CSI processes for which CSI reports as derived from a specified measurement subframe set are to be transmitted to the eNB; and,
  if RRC configuration messaging indicates that CSI for a particular CSI process is to be reported using a common rank indicator (RI), a common precoding matrix indicator (PMI), or a common preferred set of subbands that indicates use by another CSI process for the same measurement subframe set, drop the RI, PMI, or preferred set of subbands from the CSI report.

2. The device of claim 1 wherein the set of IM resources is a subset of the set of ZP CSI-RS resources.

3. The device of claim 2 wherein the set of ZP CSI-RS resources is transmitted as a 16-bit bitmap with each bit corresponding to a particular CSI-RS configuration that is to be regarded as having zero transmission power and further wherein the set of IM resources is configured with a bitmap indicating which of the ZP-CSI resources are to be used for interference measurements.

4. The device of claim 1 wherein the RRC configuration message further includes an indication that one or more particular NZP CSI-RS resources is an interference measurement (IM) resource for use by the UE in making interference measurements.

5. The device of claim 1 wherein the processing circuitry is to receive RRC configuration messaging that configures one or more indexed CSI processes, where each CSI process is as a combination of a NZP CSI-RS resource, IM resource, and measurement subframe set specifying for which subframes set CSI is to be reported by the UE.

6. A base station for acting as an evolved node B (eNB) in a Long Term Evolution (LTE) network, comprising:
a transceiver for providing an LTE air interface to a plurality terminals; and,
processing circuitry connected to the transceiver and to:
act as a serving cell to a user equipment (UE) and act as one of a plurality of cooperating coordinated multi-point (CoMP) transmission points (TPs) for the UE;
configure the UE to receive channel state information (CSI) reference signals (CSI-RS) transmitted from one or more of the cooperating TPs by transmitting a radio resource control (RRC) configuration message to the UE;
wherein the RRC configuration message includes a set of indexed non-zero power (NZP) CSI-RS resources that are to be included in a CoMP measurement set, a set of zero power (ZP) CSI-RS resources, and a set of indexed interference measurement (IM) resources for use by the UE in making interference measurements;
wherein the set of IM resources is a subset of the set of ZP CSI-RS resources;
transmit RRC configuration messaging to the UE that configures a plurality of CSI processes for which CSI reports as derived from a specified measurement subframe set are to be transmitted to the eNB; and,
transmit an RRC message instructing the UE to drop a rank indicator (RI), a precoding matrix indicator (PMI), or preferred set of subbands from the CSI report for a particular CSI process if the RI, PMI, or preferred set of subbands is reported by a another CSI process for the same measurement subframe set.

7. The base station of claim 6 wherein the RRC message further includes subframe configuration periods including subframe offsets for separately specifying the periodicity of the NZP CSI-RS, IM resources, and the ZP CSI-RS.

8. The base station of claim 6 wherein the set of ZP CSI-RS resources is transmitted as a bitmap with each bit corresponding to a particular CSI-RS configuration that is to be regarded as having zero transmission power and further wherein the set of IM resources is configured with a bitmap indicating which of the ZP-CSI resources are to be used for interference measurements.

9. The base station of claim 8 wherein the set of IM resources is configured with a bitmap with each bit corresponding to a particular group of four resource elements (REs) belonging to the set of ZP CSI-RS or is configured with a bitmap with each bit corresponding to a particular resource element (RE) pair belonging to the set of ZP CSI-RS resources.

10. The base station of claim 6 wherein the set of IM resources is configured as a particular CSI-RS configuration with four antenna ports whose resources are to be used by the UE for interference measurement or is configured as a particular CSI-RS configuration with two antenna ports whose resources are to be used by the UE for interference measurement.

11. The base station of claim 6 wherein the processing circuitry is to transmit explicit indexes of the NZP CSI-RS resources in the RRC message.

12. The base station of claim 6 wherein the processing circuitry is to implicitly indicate the indexes of the NZP CSI-RS resources by their order of configuration in the RRC message.

13. A base station for acting as an evolved node B (eNB) in a Long Term Evolution (LTE) network, comprising:
a transceiver for providing an UE air interface; and
processing circuitry connected to the transceiver and to:
act as a serving cell to a user equipment (UE) and act as one of a plurality of cooperating coordinated multi-point (CoMP) transmission points (TPs) for the UE;
configure the UE to receive channel state information (CSI) reference signals (CSI-RS) transmitted from one or more of the cooperating TPs by transmitting a radio resource control (RRC) configuration message to the UE;
wherein the RRC configuration message includes a set of indexed non-zero power (NZP) CSI-RS resources that are to be included in a CoMP measurement set and a set of zero power (ZP) CSI-RS resources;
wherein the RRC configuration message further includes an indication that one or more particular NZP CSI-RS resources is an interference measurement (IM) resource for use by the UE in making interference measurements;
configure a plurality of indexed CSI processes via RRC messaging, where each CSI process is as a combination of a NZP CSI-RS resource, and IM resource, and a measurement subframe set specifying for which subframes CSI is to be reported by the UE; and,
configure the UE to transmit CSI reports concatenated in increasing order of CSI process index and, for each CSI process index when carrier aggregation is configured, concatenated in increasing order of cell index.

14. The base station of claim 13 wherein the processing circuitry is to transmit an RRC message including configuration of multiple indexed IM resources for enabling interference measurements by the UE for multiple interference hypotheses.

15. The base station of claim 14 wherein the processing circuitry is to transmit explicit indexes of the IM resources in the RRC message.

16. The base station of claim 14 wherein the processing circuitry is to implicitly indicate indexes of the IM resources by their order of configuration in the RRC message.

17. The base station of claim 13 wherein the processing circuitry is to transmit explicit indexes of the NZP CSI-RS resources in the RRC message.

18. The base station of claim 13 wherein the processing circuitry is to implicitly indicate indexes of the NZP CSI-RS resources by their order of configuration in the RRC message.

19. A method for operating an evolved node B (eNB) in a Long Term Evolution (LTE) network, comprising:
acting as a serving cell to a user equipment (UE) and acting as one of a plurality of cooperating coordinated multi-point (CoMP) transmission points (TPs) for the UE;
configuring the UE to receive channel state information (CSI) reference signals (CSI-RS) transmitted from one or more of the cooperating TPs by transmitting a radio resource control (RRC) configuration message to the UE;
wherein the RRC configuration message includes a set of indexed non-zero power (NZP) CSI-RS resources that are to be included in a CoMP measurement set, a set of zero power (ZP) CSI-RS resources, and an indexed set of interference measurement (IM) resources for use by the UE in making interference measurements;

configuring a plurality of indexed CSI processes via RRC messaging, where each CSI process is as a combination of a NZP CSI-RS resource, and IM resource, and a measurement subframe set specifying for which subframes CSI is to be reported by the UE; and, configuring the UE to transmit CSI reports concatenated in increasing order of CSI process index and, for each CSI process index when carrier aggregation is configured, concatenated in increasing order of cell index.

20. The method of claim 19 further comprising configuring two or more CSI processes such that CSI is to be reported using a common rank indicator (RI), a common precoding matrix indicator (PMI), or a common preferred set of subbands.

21. The method of claim 19 further comprising, if carrier aggregation is configured, configuring the one or more indexed CSI processes with a cell index indicating for which component carrier the CSI process is defined.

22. The method of claim 21 wherein the CSI process index is unique across multiple component carriers.

23. The method of claim 21 wherein the CSI process index is unique within each configured component carrier.

24. The method of claim 21 wherein the CSI process index is equal to a default value when only one CSI process on the component carrier or a transmission mode not supporting CoMP can be configured.

25. The method of claim 19 further comprising configuring each CSI process with a set of restricted PMIs for reporting CSI.

26. The method of claim 19 further comprising configuring aperiodic CSI process sets via an RRC message with a bit string where each bit of the bit string corresponds to a CSI process index and indicates whether or not CSI is to be reported by the UE when a corresponding trigger is received.

* * * * *